États-Unis Patent Office 3,810,779
Patented May 14, 1974

3,810,779
METHOD AND APPARATUS FOR DEPOSITING PRECISELY METERED QUANTITIES OF LIQUID ON A SURFACE
Charles G. Pickett, Andover, and James V. Molnar, Hopatcong, N.J., assignors to Bio-Medical Sciences Inc., Fairfield, N.J.
Filed June 7, 1971, Ser. No. 150,309
Int. Cl. B44d 1/02
U.S. Cl. 117—37                         14 Claims

ABSTRACT OF THE DISCLOSURE

A method and apparatus are disclosed for depositing precisely metered quantities of a liquid on a plate or like surface. A tubular needle is positioned vertically in a non-deposition position above the surface on which deposition is to be effected, and a pool of the liquid is maintained a distance above the plate, the surface level of the pool being spaced at or slightly below the level of the lower tip end of the needle with the liquid in the pool being communicated to the needle through a suitable conduit. Due to the relative location or points of elevation of the lower tip end of the needle in such non-deposition position and the pool surface, no head pressure is exerted in the liquid at the needle lower tip end which would tend to cause outflow of liquid from the needle. Further, backflow of liquid from the needle and conduit to the pool is resisted by capillary action in the liquid due to the size of the needle and conduit in relation to the viscosity of the liquid so that the needle and conduit are filled with liquid at all times. The tubular needle is then stroked downwardly from its non-deposition position toward the plate at a certain speed creating a head pressure in the liquid at the needle lower tip end by reason of the increasing differential between the pool level and that of the needle lower tip end, and causing, due to head pressure and kinetic action, creation of a ball of liquid of certain size at the lower tip end during downward movement of the needle with the ball being retained at the lower tip end due to capillary action. The downward displacement of the needle is terminated in a second or deposit position thereof when the ball of liquid contacts the plate on which deposition is to take place, and the adhesive attraction of the plate draws the ball of liquid from the needle tip whereupon the needle is retracted upwardly to its first position leaving deposited on the plate a precisely metered quantity of liquid. Apparatus for depositing the liquid on the plate in a plurality of separate deposits in a suitable matrix arrangement also is disclosed.

BACKGROUND OF THE INVENTION

In the copending application of Zsigmond Sagi et al., Ser. No. 58,001 entitled "Temperature Indicator," filed July 24, 1970, now U.S. Pat. No. 3,665,770, there is described a disposable type thermometer suitable for various uses including clinical testing service. The thermometer comprises an elongated thermally conductive sheet on which is disposed at a plurality of locations, a thermally responsive substance which changes from solid to liquid state at a precise predetermined temperature. Also included in the thermometer are suitable indicator means which are in communication with the thermally responsive substance so that upon a change of state of the latter, the indicator means gives visual evidence of the initiation of such change and signals a particular temperature value associated with the change of state of the thermally responsive substance. For clinical testing purposes covering a testing range of between 96° and 104° F. inclusive, and for denoting temperature in graduations of two-tenths of a degree, as many as forty-five separate deposits of the thermally responsive substance must be deposited on the thermally conductive sheet. Conveniently, the deposits can be made in cup-shaped cavities formed in the sheet. The operation of the thermometer described in the said copending application Ser. No. 58,001 to be of most practical value and to have a short triggering time for indicating temperature values, requires that very small amounts of the thermally responsive substance, e.g., 0.3 mg., be used in each of the various cavities of the conductive sheet. Moreover, since the thermally responsive substance in any one cavity of the sheet is associated with a temperature value different than that in any other cavity, and since an excess or shortage of such substance in a particular cavity could produce false temperature indication, the amounts of thermally responsive substance deposited in the cavities must be very accurately controlled within prescribed values. For the purpose of depositing precisely metered amounts of the thermally responsive substance on the thermally conductive sheet, known methods and devices for depositing metered amounts of the thermally responsive substance would not be satisfactory particularly if the mode of deposition is to commend itself to incorporation in mass production manufacturing procedures. For example, known metering devices such as needle-type valves, sampling valves, etc. would be unsatisfactory for depositing such precisely required quantities of liquid because the inherent lag involved in moving a closure member from full open to full close position, and vice versa, cannot be so accurately controlled as to permit accurate deposition of liquid quantities of as small as .3 milligrams with constancy and accuracy of deposition action.

SUMMARY OF THE INVENTION

The present invention is concerned generally with improvements in the method and apparatus with which precisely metered quantities of a liquid can be deposited on a receiving component such as a plate, strip or the like. It is specifically concerned with an improved method and apparatus by which precisely metered quantities of a liquid can be deposited on a foil carrier in quantities of less than 0.3 milligram. A particularly advantageous application of the present invention is for the purpose of depositing the thermally responsive substance described in the copending application of Zsigmond Sagi et al., Ser. No. 120,998, entitled "Temperature Indicating Compositions" in the cavities of the disposable thermometer described in the copending application of the same inventors, Ser. No. 58,001 filed July 24, 1970. In accordance with the present invention, the liquid to be deposited in a precisely metered quantity on a suitable receiving component can be deposited in any suitable pattern or arrangement on the receiving component by means of a vertically disposed deposition element such as a separate tubular needle associated with each deposit and which is positioned upright in a first position with its lower tip end spaced a distance above the component upon which the deposition is to be made. A pool or quantity of the liquid being deposited is maintained in a suitable vessel which also is positioned at a height some distance above the component upon which deposition is to be effected and with the level of the pool spaced at or slightly below the needle lower tip end with the latter in its first position. A suitable tubular conduit is employed to connect the pool with the upright needle and is sized in accordance with the quantity requirements of the deposition and the viscosity characteristics of the liquid. The liquid in the pool is communicated to the tubular needle by means of a small conduit extending between the pool and the upper tip end of the tubular needle, the conduit for convenience having a U-bend in its course spaced above the surface or plate upon which deposition is to be made, but below the lower tip end of the needle when the latter is in its first position. Normally with the needle in its first position and with regard to its position and the pool level, there is no head pressure in the liquid at the lower tip end of the needle as would tend to cause outflow of liquid from the needle. Further, the conduit and tubular needle are sized in such relation to the viscosity of the liquid as to produce capillary retention of liquid in the needle and conduit which prevents backflow of liquid from the needle and conduit to the pool. When it is desired to effect deposition of the liquid on the receiving component, the tubular needle is lowered or displaced at a certain speed from its first position downwardly in the direction of the plate to produce head pressure and kinetic momentum in the liquid at the needle lower tip end, initiating a slight outflow of liquid from the lower tip end to form a ball of liquid at the lower tip end, with the capillary action in the needle being sufficient however to retain the ball at the lower tip end. The downward displacement of the needle is terminated at a second position in which the ball of liquid at the lower tip end thereof contacts the plate. The force of adhesion of the plate acting on the ball of liquid draws the ball onto the plate whereupon the needle is immediately stroked upwardly to prevent further outflow of the liquid from the tubular needle since capillary action will function to preclude such further outflow while the needle being retracted upwardly to its first position. The ball of liquid which was removed from the needle lower tip end by the force of adhesion of the plate provides a precisely metered deposit of the liquid on the plate.

In accordance with the invention, the level of the pool can be maintained between certain maximum and minimum values of height above the plate when the needle is in its first position without altering to any appreciable degree the head pressure exerted on the liquid at the needle lower tip end during descent of the needle from such position. In this manner the quantity of deposition will not vary to an extent that it will be beyond prescribed values. Moreover, the pool level can be continuously monitored so that if such pool level should reduce in height above the plate to a minimum range value, a replenishment of liquid to the pool can be effected through automatically operating devices which will restore the level to a prescribed value.

The invention also provides apparatus with which the deposition of the liquid in precisely metered quantities can be effected. Such apparatus comprises a deposition unit including a vial in which the pool of liquid is confined, an associated tubular needle, and a reservoir with which replenishment of the vial is effected as required. For the purpose of depositing a liquid in each of a plurality of separate cavities, as for example, the cavities of the clinical disposable thermometer described in the aforementioned application Ser. No. 58,001, a corresponding number of deposition units are provided, the tubular needles being mounted on a deposition head so that the deposition of liquid in the respective cavities of the plurality of the same is effected in a unitary operation. For the purpose of replenishing the supply of liquid to the vial of each unit when the pool level falls to a prescribed minimum value, a monitoring device in the form of a pair of thermistors is provided in each vial positioned at different elevations therein. When the pool level falls below a prescribed minimum value and uncovers the uppermost of the thermistors altering the balance of an electrical bridge in a comparator unit, the comparator unit operates to effect opening of a solenoid operated valve disposed in a conduit connecting the vial with a reservoir to open same and replenishment flow takes place until such time as the pool level is raised to a prescribed value. At the latter level the liquid again covers both thermistors restoring balance to the electrical bridge, and a suitable signal is generated from the comparator to effect closing of the valve in the supply line from the reservoir.

The invention accordingly comprises the several steps and the relation of one or more of such steps with respect to each of the others, and the device embodying features of construction, combination of elements, and arrangements of parts which will adapt to effect such steps, all as exemplified in the following detailed disclosure and the scope of the invention will be indicated in the claims.

BRIEF DESCRIPTION OF THE DRAWINGS

Other objects of the invention will be in part obvious and will in part appear from the detailed description taken in conjunction with the accompanying drawings wherein like reference numerals identify like parts throughout and in which.

DESCRIPTION OF THE PREFERRED EMBODIMENTS

The method and apparatus of the present invention will be described herein as the same are employed in conjunction with the deposition of precisely metered quantities of a chemical solution in a plurality of separate deposits on a sheet comprising a disposable clinical type thermometer. In particular, the description is representative of the manner in which a chemical binary solution of a thermally responsive substance can be deposited in precisely metered quantities on the thermometer described in the earlier mentioned application Ser. No. 58,001. However, it will be understood that the invention has a wider range of applicability wherein precise metering deposition of a liquid is the essential requirement. Such deposition can be of single or plural deposits on a support, a succession of deposits at the same location on the support as might be used for a plural-layered element. The utilization of the present invention also may involve deposition of a liquid which is of single component character or one which is of plural component character, e.g., a binary solution of two chemicals. Furthermore, the liquid may be a type which normally is a solid substance at ambient or room temperature but is heated to liquid state for deposition purposes and solidifies on the support following deposition.

Figure 1:
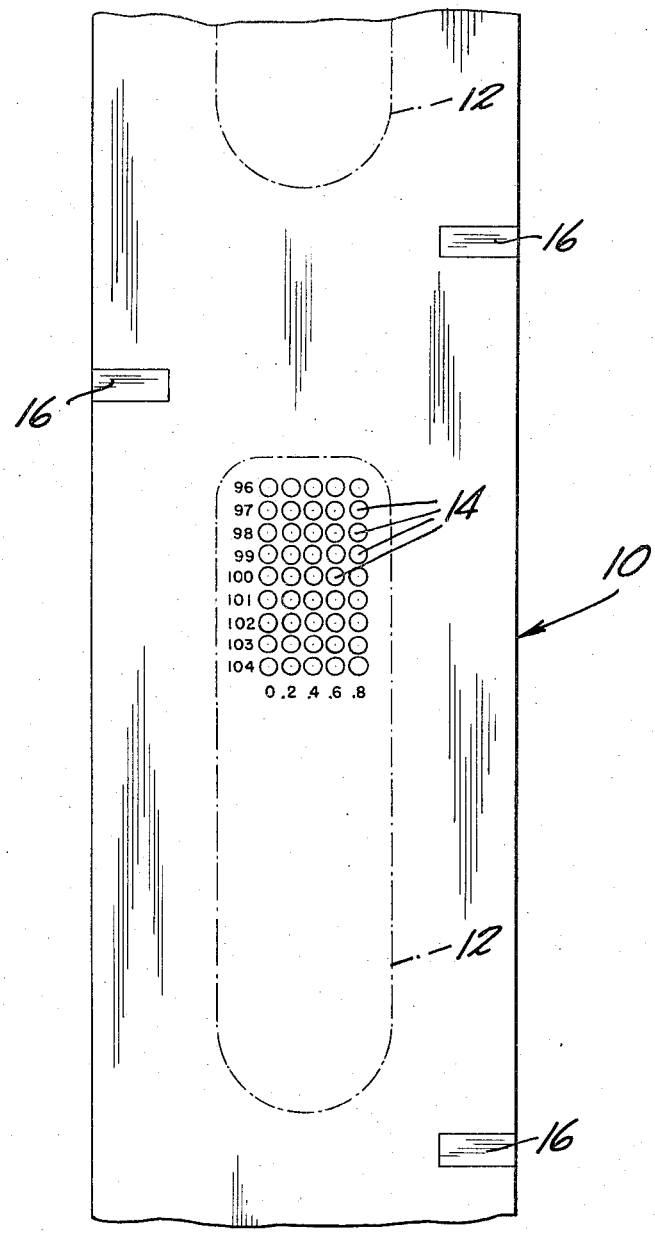
FIG. 1 is a plan view of a portion of a continuous strip of material in which disposable thermometers of the type disclosed in the aforementioned application Ser. No. 58,001 are formed, each thermometer unit formed in the sheet requiring deposition of precisely metered quantities of a liquid substance thereon in a matrix pattern involving forty-five separate but simultaneously effected depositions.

Referring now to FIG. 1, there is depicted a continuous sheet component or plate 10 in which is formed at spaced locations therein, a device 12, e.g., a disposable thermometer (depicted in phantom outline since the device 12 ultimately is severed from the sheet 10), on which precisely metered quantities are to be deposited at a number of locations. Such locations can comprise, e.g., a matrix of cup-shaped cavities 14, preformed in the sheet as described in the application Ser. No. 58,001. It will be understood, of course, that the use of cavities is only for purposes of convenience as the deposition can be effected on any surface, plane, convex, concave or otherwise and without recourse to indicia or structure delineating the deposition area or areas. Furthermore, it will be appreciated that "plate" as used herein is intended to connote any form of support, device or surface of a structure on which deposition is to be made.

The amount to be deposited at each location 14 can be the same or it may vary from one location to the next, the essential requirement being that the amount deposited at each location be precise in respect of the amount intended for deposition. Sheet 10 can include marginal block indicia 16 of color contrast with the rest of the sheet which function as sensing points on the sheet which can be detected by sensing means in the manufacturing line to control strip movement and operation of the deposition apparatus. For example, a photocell 20 detecting the presence of indicia 15 upon arrival of the latter at a deposition station in the manufacturing line, can be employed in known manner to effect stopping of sheet travel and initiate descent of a deposition head assembly in the manner to be described later. Such a photocell arrangement is depicted generally in FIG. 2.

Figure 2:
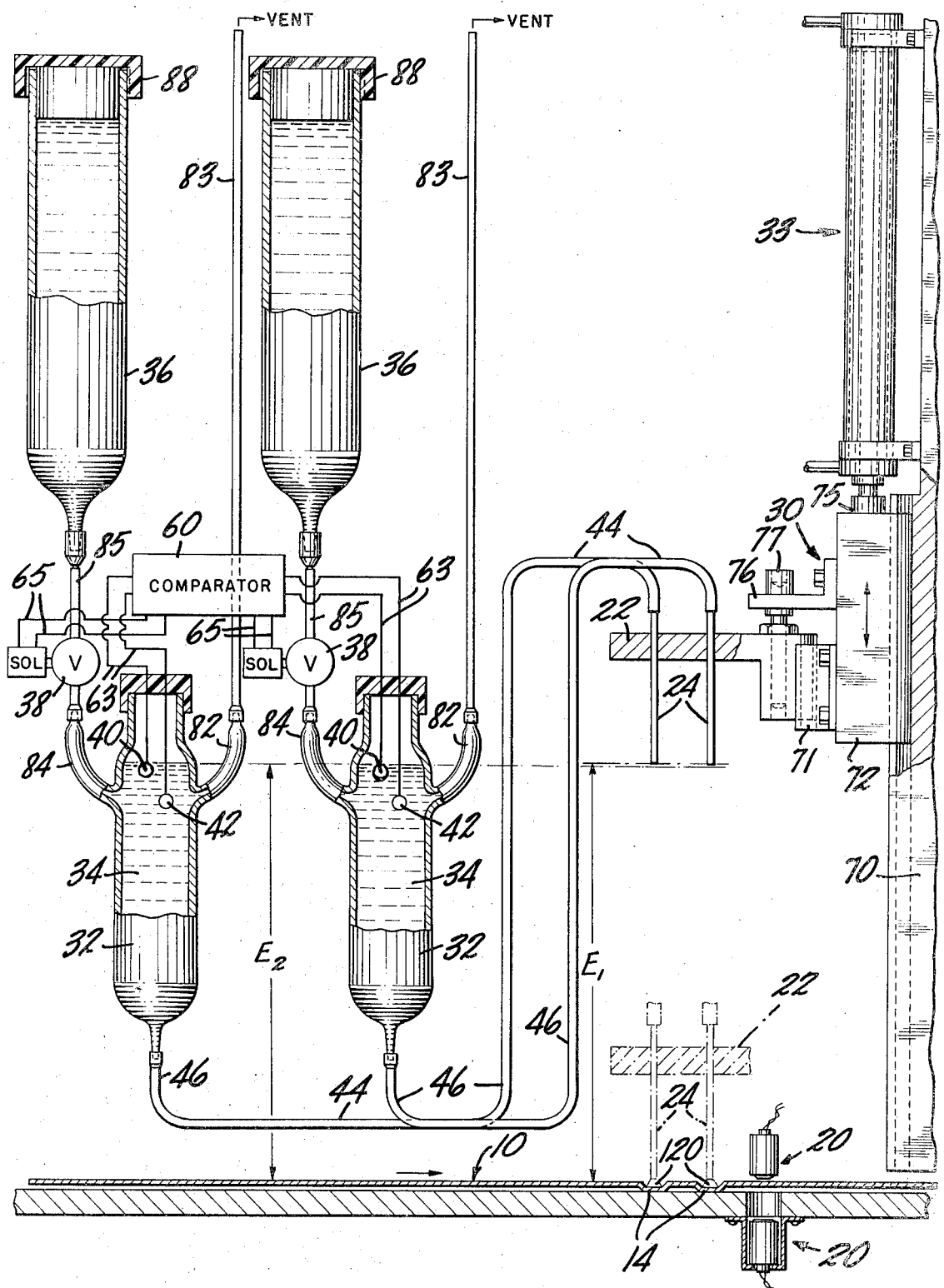
FIG. 2 is an elevational view depicting apparatus with which precisely metered quantities of liquid can be deposited on a plate or like surface in accordance with the principles of the present invention, only two deposition units being depicted, but it being understood that a plurality of as many as forty-five units can be employed for simultaneous deposition of a like quantity of deposits.

Turning now to FIG. 2, the apparatus with which precisely metered deposition of liquid can be effected includes a deposition assembly including a mounting plate or deposition head 22 in which is mounted a number of deposition devices, e.g., tubular needles 24, the needles being positioned vertically or upright in the head 22, and having the lower tip ends of the needles in a first position thereof spaced a distance of $E_1$, above the sheet 10. The head 22 is fixed to a sliding block assembly shown generally at 30 and mounted for vertical sliding travel in respect of an upright support or standard 70. The sliding block assembly 30 in turn in connected with a fluid-actuated ram or piston assembly 33, as at 75, the latter being employed for stroking the head downwardly to effect deposition of the liquid and to retract the head following deposition. While only two needles 24 only are depicted as mounted in the deposition head 22, it will be understood that a separate needle is provided in the head for each separate deposit to be made on the sheet or plate 10. Mounting plate 22 it will be noted is slidably received in a fixed block 71 which in turn is connected to a further sliding block 72 connected to standard 70, the sliding block 72 providing the point of physical connection of the ram 33 with assembly 30. Also provided in assembly 30 is a bracket 76 in which is received an adjustment screw 77 extending into the mounting plate 22 for the purpose of adjusting the same to correspondingly adjust the positioning of the lower tip end of the needle 24 when in their first position, i.e., alter elevation $E_1$.

Each needle 24 is part of a separate dispensing unit associated with each separate deposition being made. Accordingly each needle has associated therewith a vial 32 for holding a pool 34 of the liquid, a replenishment reservoir 36, a valve 38 controlling flow between the reservoir 36 and the vial 32, and pool level sensing means in the form of a pair of thermistors 40, 42 disposed in the vial 32. The reservoirs 36 and vials 32 can be supported in suitable bank arrangement in known manner with the vials being arranged such that the pool level of the liquid therein is spaced a distance $E_2$ above the sheet 10, such distance providing that the pool level is substantially at or slightly below the lower tip end of its associated needle when the latter is in its first or elevated position. Each dispensing unit also includes a capillary tube or conduit 44 for connecting the pool 34 to the associated tubular needle (at the upper tip end of the latter), each capillary tube 44 having for convenience, a U-bend therein as at 46 in its course spaced above the sheet 10 but below the lower tip end of the associated needle. The utilization of a U-bend in the capillary tube 44 is advantageous in that it allows for outflow from the bottom of the vial 32 insuring proper turnover of the liquid supplied to the vial, it insures the presence of a liquid head at the point of outflow from the vial, which for example, would not be of desirable magnitude if outflow were to be from a location at the side of the vial adjacent the pool level, and the U-bend provides slack to facilitate movement of the tube 44 during deposition. Each vial 32 is provided with a pair of tubular wings, one wing 82 providing for incursion of air from atmosphere through vent 83 to the top of the pool. The other wing 84 provides a conduit means for entry of liquid from the reservoir 36 through fill conduit 85. The reservoir 36 of each unit also is open to atmosphere being provided for this purpose with a cap 88 which admits air to the reservoir.

It should be understood that the depiction in FIG. 2 of the relative size of the vials 32 and needles 24 are not to scale since as will be described later, the elevation $E_1$, as used in conjunction with dispensing a particular binary mixture of two components comprising a thermally responsive substance is substantially 1⅝", whereas the vials used in such instance are filled with a pool of such liquid of 2" or more in height above the bottom of the vial.

Each deposition unit also includes a solenoid operated diaphragm type valve 38 disposed in the fill conduit 85 and which as will be described later is operated to admit replenishment of liquid from the reservoir 36 to the vial 32.

With the tubular needles 24, of each dispensing unit in its first or elevated position, there is substantially no difference of elevation in the pool level ($E_2$) and that of the needle lower tip end ($E_1$), and thus there is exerted no head pressure in the liquid at the needle lower tip end which would tend to cause outflow of liquid from the latter. Furthermore, the capillary tube 44 of each dispensing unit and its associated needle is sized in relation to the viscosity of the liquid to produce a capillary retention of liquid in said needle and capillary tube preventing backflow of liquid from the needle and capillary tube to the vial 32 so the needle and tube 44 are always filled with liquid.

To effect deposition of the liquid onto the sheet 10, piston assembly 33 is actuated to stroke the mounting plate or head 22 downwardly at a certain predetermined speed in the direction of the sheet 10, such action having the effect of producing a head pressure ($E_2-E_1$) and kinetic momentum in the liquid at each needle lower tip end and initiating outflow of liquid from the needle 24, such outflow due to the needle size and viscosity of the liquid being in the form of a ball of liquid retained on the needle lower tip end retained thereon by capillary action. The downward movement of the head is terminated when each needle 24 is in a second or lowered position as shown in phantom lines in FIG. 2, in which position the lower tip end of each needle is spaced just above sheet 10 but not in contact therewith. The ball of liquid at the lower tip end does, however, contact the sheet 10 and the force of adhesion of the latter draws the ball off the needle, the needles 24 being retained in such second position only momentarily whereupon the head 22 is stroked upwardly to its first position and the capillary action in the needle tip end prevents further outflow of liquid, the deposited ball of liquid being the desired precisely metered quantity intended for deposition.

From the foregoing it will be understood that the capacity for achieving precisely metered depositions of the liquid is a function of the speed at which the needles 24 are stroked downwardly as well as the distance they are stroked from first to second positions. By employing a speed and stroke of certain predetermined values, the outflow of liquid from the needles produced by an increasing head pressure and kinetic momentum during downward travel of the needles, the liquid can be controlled to provide a ball thereof of predetermined size in correspondence to the quantity sought to be deposited. In a particular application, and more particularly for depositing the binary mixture of ortho-chloronitrobenzene and ortho-bromonitrobenzene as described in the aforementioned application Ser. No. 120,998 and further in respect of the range of composition of the two components comprising the liquid set forth in the table in such patent application, and for the purpose of depositing substantially 0.3 mg. of such liquid, a stroke of substantially 1⅝" is employed. Furthermore, in conjunction with such use, the speed of stroking is substantially ⅜ of a second downward stroking time, with substantially ¼ of a second dwell in which the ball of liquid is in contact with the sheet and ⅜ of a second return stroke time. With such parameters and where a needle with an inside diameter of 0.023" is used and a capillary tube inside diameter of 0.034" is used, there is produced a ball of liquid of approximately 0.030" diameter and comprising in weight 0.3 mg. The particular binary mixture set forth in the table of the aforementioned patent application has a viscosity of 3–5 centipoises with such viscosity value remaining substantially unchanged over the range of weight percentages set forth in the table of the aforementioned application. When depositing such binary mixture which at ambient or room temperature is a solid solution, it is necessary to maintain the binary mixture in liquid form and for which purpose the pool in the vials 32 is maintained at a temperature in the range of 115° F.–150° F.

Figure 3:
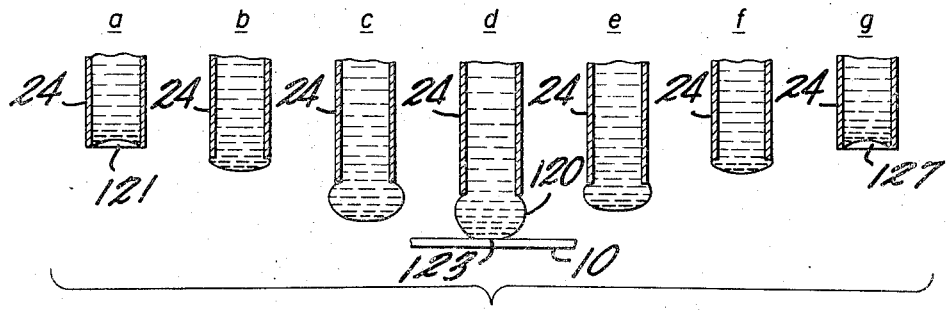
FIGS. 3a through 3g depict schematically the sequence of operations involved in making deposition on a plate in accordance with the method and apparatus of the present invention.

FIGS. 3a through 3g show the sequence of formation and deposition of a ball 120 of liquid on the sheet 10. Thus in FIG. 3a with the needle 24 in its first position, the liquid is retained therein by capillary action and a meniscus 121 exists at the needle lower tip end. As the needle is lowered toward the sheet 10, the initiation of outflow occurs forming a ball of liquid as depicted in FIGS. 3b and 3c such ball of liquid enlarging as the needle descends and assuming a generally spherical shape. When the ball of liquid 120 contacts the sheet 10 as at 123, the capillary holding of the ball is broken and it is drawn from the needle 24 as shown in FIG. 3d. When the needle is stroked upwardly, substantially the reverse cycle of the foregoing occurs as depicted in FIGS. 3e–3g except that the liquid which tends to outflow from the needle following removal of the ball 120 onto sheet 10 forms a slightly smaller spherical mass during upward retraction and reduces in size, being fully withdrawn into the needle to form a meniscus 127 by the time the needle has returned to its first position.

In accordance with the present invention, the level of the pool 34 in each dispensing unit vial 32 preferably is maintained in a predetermined range of maximum and minimum values in order to maintain the head pressure in the needle lower tip end substantially constant since substantial change in the value of $E_2$ could affect the quantity of liquid deposited. For this purpose, each vial 32 is provided with continuous level monitoring means in the form of a pair of thermistors 40, 42. The thermistors are arranged in each vial 32 at different elevations therein. Normally, one thermistor 42 is always immersed in the liquid and functions as a reference sensor. The other thermistor 40 along with the thermistor 42 is connected by suitable co-axial leads 63 with a comparator 60 which in turn is connected by leads 65 with the solenoid of the valve 38. The comparator 60 includes an electrical bridge therein of highly sensitized character which is maintained balanced by signals from the two thermistors. If the uppermost thermistor 40 should be uncovered by a drop in the level of the liquid in the pool, the drop is sensed thereby and causes a signal to be processed in the comparator which functions then to operate the solenoid valve 38 of each unit opening the same and replenishing liquid to the vial to restore the level therein. When the level is restored the signal from thermistor 40 to the comparator matches that of thermistor 42 and the electrical bridge means is once again balanced and a signal is sent to the solenoid valve 38 closing the same.

Thus, it will be noted from the foregoing that the present invention provides a novel method and apparatus for depositing with constancy and accuracy precisely metered quantities of a liquid on a surface. As will be appreciated by those skilled in the art, modifications in certain of the parameters set forth before will be made for depositing different types of liquid. Thus, depending upon the quantity and viscosity of the liquid, different stroking distances and depositing cycle times will be required as well as different inside diameters of the depositing component and capillary tube. Certain other modifications will occur to those skilled in the art, as for example, different forms of material for use in the capillary tube as well as the tubular needle. Teflon is preferred for the capillary tubes 44 when depositing the binary solution described earlier since Teflon is compatible with the binary solution and does not react with the same.

What is claimed is:

1. A method for depositing precisely metered quantities of a liquid onto a plate comprising positioning a tubular needle vertically in a first position with a lower tip end of said needle spaced a predetermined distance above said plate, maintaining a pool of said liquid a distance above said plate with the surface level of said pool being spaced substantially at or slightly below the lower tip end of said needle when the later is in said first position, communicating the liquid in said pool to said needle through a conduit connecting the pool with the upper tip end of said needle, said conduit and tubular needle being sized in relation to the viscosity of said liquid to provide capillary retention of fluid in said needle and conduit preventing backflow of liquid from said needle and conduit to said pool with said needle in said first position, vertically displacing said tubular needle downwardly in the direction of said plate at a predetermined speed to establish a positive liquid head pressure and kinetic momentum in said liquid at the needle lower tip end therewith to cause during needle downward displacement sufficient outflow of said liquid from the needle lower tip end to form a ball of liquid of predetermined size at said lower tip end, the capillary action in said needle being sufficient to retain said ball at said needle lower tip end during said downward displacement, the downward displacement of said needle being effected for a predetermined distance and being terminated at a second position of said needle when said ball of liquid contacts said plate, said needle being retained in said second position only momentarily while removal of said ball of liquid from said needle lower tip end by the force of adhesion of said plate is effected, and thereafter displacing said tubular needle upwardly to cause the capillary action in said needle to prevent further outflow from said tubular needle and until the lower tip end thereof is again spaced in its first position said predetermined distance above said plate.

2. The method of claim 1 wherein said liquid is a binary mixture.

3. The method of claim 2 wherein said liquid is a mixture of ortho-chloronitrobenzene and ortho-bromonitrobenzene.

4. The method of claim 3 wherein said mixture is maintained in said pool in a heated condition.

5. The method of claim 4 wherein said mixture is maintained in said pool at a temperature of between 115° F. and 150° F.

6. The method of claim 1 wherein the predetermined distance at which the level in said pool is maintained above said plate is in a predetermined range of maximum and minimum values.

7. The method of claim 1 further comprising continuously monitoring the height of the level in said pool above said plate, and replenishing the liquid in said pool when it falls below the minimum value of said predetermined range of values.

8. Apparatus for depositing precisely metered quantities of a liquid onto a plate which comprises
a tubular needle,
means for supporting said tubular needle vertically in a first position with a lower tip end of said needle spaced a predetermined distance above said plate,
means for confining a pool of said liquid a distance above said plate with the surface level of said pool being at or slightly below the lower tip end of said needle when the latter is in said first position,
a conduit for communicating the liquid in said pool to the upper tip end of said needle, said conduit and tubular needle being sized in relation to the viscosity of said liquid to produce a capillary retention of liquid in said needle and conduit thereby preventing backflow or liquid from said needle and conduit to said pool with said needle in said first position, and
means for vertically displacing the means supporting said tubular needle downwardly a predetermined distance in the direction of said plate at a predetermined speed to establish a positive liquid head pressure and kinetic momentum in said liquid at the needle lower tip end therewith to cause during needle downward displacement sufficient outflow of said liquid from the needle lower tip end to form a ball of liquid of predetermined size at said lower tip end, the capillary action in said needle being sufficient to retain said ball at said needle lower tip end during said downward displacement, said predetermined distance of downward displacement of said needle being reached when said ball of liquid contacts said plate and is removed from said needle lower tip end by the force of adhesion of said plate,
the last-mentioned means being operated when said predetermined distance is reached to immediately retract said needle upwardly to cause the capillary action in said needle to prevent further outflow from said tubular needle and until the lower tip end thereof is again spaced in its first position said predetermined distance above said plate.

9. The apparatus of claim 8 wherein the means for supporting said tubular needle comprises a mounting plate assembly, and a standard, said mounting plate assembly being connected with said standard to vertical sliding travel thereon.

10. The apparatus of claim 9 wherein the means for vertically displacing said mounting plate assembly comprises a fluid-actuated ram connected with said mounting plate assembly.

11. The apparatus of claim 9 further comprising means connected with said mounting plate assembly for selectively adjusting the height of said needle lower tip end above said plate when said needle is in its first position.

12. The apparatus of claim 8 further comprising means for monitoring the level of liquid in said pool, and means for replenishing liquid in said pool when said level drops below a predetermined value.

13. The apparatus of claim 12 wherein said monitoring means comprises a pair of thermistors disposed at different elevations in said pool, a comparator including a normally balanced bridge circuit connected with said pair of thermistors, the means for replenishing said liquid comprising a reservoir connected with said pool, and an electrically operated control valve disposed in said supply conduit, a drop of the level of liquid in said pool below the thermistor at the higher elevation therein causing an unbalance in said bridge circuit generating a signal in said comparator for operating said control value.

14. The apparatus of claim 8 wherein the means for confining said pool of liquid comprises a vial, said apparatus further comprising a plurality of needles, a corresponding plurality of vials and a separate conduit connecting each needle with a corresponding separate one of said vials.

References Cited

UNITED STATES PATENTS

| 2,800,418 | 7/1957 | Cannon | 118—412 |
| 1,929,877 | 10/1933 | Bonamico | 117—120 |
| 3,572,400 | 3/1971 | Casner et al. | 222—420 |
| 2,556,550 | 6/1951 | Murray | 118—401 |
| 3,404,025 | 10/1968 | Wootten | 117—120 |

FOREIGN PATENTS

| 1,332,736 | 6/1963 | France | 118—401 |

MURRAY KATZ, Primary Examiner

U.S. Cl. X.R.

117—120; 118—401, 410; 73—356; 222—420